US008990304B2

(12) United States Patent
Hameleers et al.

(10) Patent No.: US 8,990,304 B2
(45) Date of Patent: Mar. 24, 2015

(54) METHOD FOR PROVIDING MULTIMEDIA INFORMATION TO A CALLING PARTY AT CALL SET UP

(75) Inventors: Heino Hameleers, Kerkrade (NL); Frank Hundscheidt, Kerkrade (NL)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 385 days.

(21) Appl. No.: 10/595,781

(22) PCT Filed: Nov. 11, 2003

(86) PCT No.: PCT/EP03/12541
§ 371 (c)(1),
(2), (4) Date: Apr. 20, 2007

(87) PCT Pub. No.: WO2005/046189
PCT Pub. Date: May 19, 2005

(65) Prior Publication Data
US 2007/0198650 A1 Aug. 23, 2007

(51) Int. Cl.
*G06F 15/16* (2006.01)
*H04M 1/57* (2006.01)
*H04M 1/725* (2006.01)
*H04M 3/42* (2006.01)
*H04W 4/16* (2009.01)
*H04W 4/20* (2009.01)

(52) U.S. Cl.
CPC .......... *H04M 1/72547* (2013.01); *H04M 1/575* (2013.01); *H04M 3/42059* (2013.01); *H04W 4/16* (2013.01); *H04W 4/20* (2013.01)
USPC ......................................................... 709/205

(58) Field of Classification Search
USPC ................................................. 709/205, 217
See application file for complete search history.

(56) References Cited

U.S. PATENT DOCUMENTS

| | | | | |
|---|---|---|---|---|
| 5,228,080 A * | 7/1993 | Nutter et al. | ............. | 379/373.02 |
| 5,864,612 A * | 1/1999 | Strauss et al. | ............. | 379/142.03 |
| 6,031,899 A * | 2/2000 | Wu | ........................... | 379/142.01 |
| 6,671,370 B1 * | 12/2003 | Heinonen et al. | ........ | 379/373.02 |
| 6,785,522 B2 * | 8/2004 | Ryu | ........................... | 455/200.1 |
| 6,970,706 B2 * | 11/2005 | Siemens | ..................... | 455/435.3 |
| 7,043,530 B2 * | 5/2006 | Isaacs et al. | ................... | 709/206 |
| 7,055,174 B1 * | 5/2006 | Cope et al. | ........................ | 726/22 |
| 7,246,151 B2 * | 7/2007 | Isaacs et al. | ................... | 709/206 |
| 7,280,502 B2 * | 10/2007 | Allen et al. | .................... | 370/329 |
| 7,424,272 B2 * | 9/2008 | Horiguchi | ..................... | 455/90.1 |
| 7,555,109 B2 * | 6/2009 | Nguyen et al. | ............. | 379/207.16 |
| 2004/0114732 A1 * | 6/2004 | Choe et al. | ................... | 379/88.17 |
| 2004/0120477 A1 * | 6/2004 | Nguyen et al. | ............. | 379/88.19 |

FOREIGN PATENT DOCUMENTS

| | | | |
|---|---|---|---|
| EP | 0 973 309 A | | 1/2000 |
| EP | 1 296 499 A | | 3/2003 |
| WO | WO 01/41405 A | | 6/2001 |

* cited by examiner

*Primary Examiner* — Sulaiman Nooristany

(57) ABSTRACT

A method for presenting multimedia information related to a calling party to a user of a called party's terminal MS-B and for presenting multimedia information related to a called party to a user of a calling party's terminal MS-A. Information enabling presenting of multimedia information is sent from the calling party's terminal MS-A to the called party's terminal MS-B, respectively from the called party's terminal MS-B to the calling party's terminal MS-A. An identification of the called subscriber respectively the calling subscriber is used to relate the multimedia information the subscriber.

7 Claims, 7 Drawing Sheets

METHOD FOR PROVIDING MULTIMEDIA
INFORMATION TO A CALLING PARTY AT
CALL SET UP

FIELD OF INVENTION

The invention relates to a method for providing multimedia information in a call setup procedure.

DESCRIPTION OF PRIOR ART

Providing a calling party number to a called party is a feature of an ISDN (Integrated Services Digital Network) telephony network that permits a called party to get information about a caller before the call is finally set up. By this the called party can e.g. decide on the urgency of the call. In the current time the capabilities of mobile phones have been enhanced to enable the presentation of multimedia information such as pictures, videos and pieces of music to a user of a mobile phone. These capabilities have been used to present a picture of a caller that has been stored in relation to a calling party number in a database to a user of a called terminal. When a call setup message comprising a calling party number is received in the called terminal, the picture of the calling party is determined according to the calling party number from the database and the picture is presented to the user of the called terminal. However the success of this method to present a caller picture to a user of a called terminal depends on the content of the database storing the picture of a subscriber in relation to her/his MSISDN (Mobile Station Integrated Services Digital Network) number. The method fails if an unknown subscriber calls a called party for a first time, or if the caller has a new subscription.

SUMMARY OF THE INVENTION

It is object of the invention to overcome the above shortcomings of the state of the art and to present a method to provide multimedia information related to a calling party to a user of a called party's terminal as well as to provide multimedia information related to called party to the user of a calling party's terminal. This object is solved by the methods of claim 1, claim 6, claim 11, claim 12 and claim 13, the mobile stations of claim 14 and claim 15, the core network node of claim 16, the network server of claim 17 and the network database of claim 18. Advantageous embodiments are described in the dependant claims.

According to the present invention a method for providing multimedia information related to a calling party to a user of a called party's terminal is presented. The method comprises the steps of: receiving at call setup in the called party's terminal a first message comprising information enabling presenting of multimedia information related to the calling party and an identification of the multimedia information, storing the information enabling the presenting of the multimedia information related to the identification of the multimedia information, receiving in the called party's terminal a call setup message comprising the identification of the multimedia information, retrieving the multimedia information according to the identification of the multimedia information, and presenting the multimedia information to the user of the called party's terminal.

Multimedia information related to a calling party can be e.g. a picture, a video sequence, an audio stream, or a ring tone related to the calling party. It is an advantage of the proposed method that the multimedia information to be presented to the called party can be updated flexibly and can be controlled by the caller.

In an advantageous embodiment of the invention the first message comprises the multimedia information and the multimedia information is stored related to the received identification. This is a simple method for providing the multimedia information.

In another advantageous embodiment of the proposed method the first message comprises a network address enabling retrieving of the multimedia information, the network address is stored related to the identification of the multimedia information, the network address is retrieved according to the identification of the multimedia information upon reception of the call setup message and the multimedia information is retrieved using the network address.

It is an advantage of this embodiment that the called party's terminal can control the reception of the multimedia information. Furthermore the first message can be sent by a terminal, that does not store the multimedia itself. Thus the number of subscribers capable of presenting multimedia information to a called party at call setup is enlarged.

The multimedia information can be a calling line identity. The calling line identity is a well-known identification of the calling party that is already used in a call setup procedure.

The first message can comply with a packet switched protocol and the call setup message can be appropriate for setting up a circuit switched call. By this multimedia information can be presented in a call set up of a call that is not suitable for transmitting multimedia information.

The invention is further related to a method for providing multimedia information related to a called party to a user of a calling party's terminal. The method comprises the following steps performed by the terminal: storing at call set up an identification of the called party, sending a call setup message towards the called party's terminal, receiving a further message comprising information enabling presenting of multimedia information related to the called party and a further identification of the called party, comparing the stored and the further identification of the called party, retrieving the multimedia information according to the result of the comparison, and presenting the multimedia information to the user of the calling party's terminal.

In an advantageous embodiment of this method the further message comprises the multimedia information. This is a simple method for providing the multimedia information.

In another advantageous embodiment of the proposed method, the further message comprises a network address enabling retrieving of the multimedia information, and the multimedia information is retrieved using the network address. By this the further message can be sent by a terminal, that does not store the multimedia itself. Thus the number of subscribers capable of presenting multimedia information to a calling party at call setup is enlarged.

The identification of the called party can be a called party number. The called party number is a well-known identification of the called party that is already used in a call setup procedure.

The call setup message can be appropriate for setting up a circuit switched call and the further message can comply with a packet switched protocol.

A further aspect of the invention is a method for providing multimedia information related to a called party to a user of a calling party's terminal or for providing multimedia information related to a calling party to a user of a called party's terminal. The method is performed by a core network node storing or having access to subscriber data of the called or the calling party. The subscriber data comprises an indication for a demand for presenting the multimedia information. The method comprises the steps of: receiving in the core network node a call set up message comprising an identification of the called or the calling party, recognizing according to the subscriber data and the received identification of the called or the calling party the demand for providing the multimedia information, and initiating the providing of the multimedia information.

It is advantageous of this method that multimedia information related to a called party can be presented to a calling party also if the terminal of the called party is not capable of sending a message that enables retrieving of multimedia information. Thus the number of subscribers capable of presenting multimedia information to a calling party at call setup is increased.

The invention further relates to a method for providing by a network server multimedia information related to a called party to a user of a calling party's terminal or multimedia information related to a calling party to a user of a called party's terminal. The method comprises the steps of: receiving during a call setup in the network server a first message comprising a first identification of the called or the calling party, determining according to the received first identification information enabling presenting of the multimedia information related to the called or calling party and a further identification of the called or the calling party, sending a further message comprising the information enabling the presenting of the multimedia information and an identification of the called or calling party towards the respective other party's terminal.

A further aspect of the invention is a method for providing by a network database multimedia information related to a called party to a user of calling party's terminal or for providing multimedia information related to a calling party to a user of a called party's terminal. The network database stores information enabling presenting of multimedia information related to the called or the calling party. The information enabling the presenting of the multimedia information is accessible via an identification of the called or the calling party and the method comprises the steps of: receiving a request for the information enabling the presenting of the multimedia information, the request comprising the identification of the called or the calling party, retrieving the stored information enabling the presenting of the multimedia information using the received identification, and providing the information enabling the presenting of the multimedia information.

A further object of the invention is a mobile station for providing multimedia information related to a calling party during a call setup. The mobile station is provided with an interface for receiving messages, a processing system for processing said messages and an output device for presenting the multimedia information to a user of the mobile station. In the invented mobile station the processing system is adapted to process a received first message comprising information enabling presenting of the multimedia information related to the calling party and an identification of the multimedia information at call set up. The mobile station is further provided with a memory for storing the information enabling the presenting the multimedia information related to the identification of the multimedia information. The processing system is adapted to process a received call setup message comprising the identification of the multimedia information, to retrieve the multimedia information according to the identification of the multimedia information, and to initiate presenting the multimedia information to the user of the mobile station via the output device.

The invention further relates to a mobile station for providing multimedia information related to a called party during a call setup. The mobile station is provided with an interface for receiving messages and an interface for sending messages comprising a call set up message towards a called party's terminal, and an output device for presenting the multimedia information to a user of the mobile station. The invented mobile station comprises a processing system that is adapted to store at call set up a first identification of the called party, to process a received further message comprising information enabling presenting of the multimedia information and a further identification of the called party, to compare the first and the further identification of the called party and, according to the result of the comparison, to initiate presenting the multimedia information to the user of the mobile station via the output device.

The invention further relates to a core network node for providing multimedia information related to a called party to a user of calling party's terminal or for providing multimedia information related to a calling party to a user of a called party's terminal. The invented core network node comprises means for storing or providing access to subscriber data of the called or the calling party, the subscriber data comprising an indication for a demand for presenting the multimedia information. The core network node further comprises an interface for sending messages, an interface for receiving messages, and a processing system for processing said messages. The processing system is adapted to process a received call set up message comprising an identification of the called or the calling party, to recognize according to received identification of the called or the calling party the demand for the providing of the multimedia information, and to initiate the providing of the multimedia information.

A further object of the invention is a network server for providing multimedia information related to a called party to a user of calling party's terminal or for providing multimedia information related to a calling party to a user of a called party's terminal. The server comprises interfaces for sending and receiving messages and a processing system for processing said messages. The processing system is adapted to process a first message received during a call setup and comprising a first identification of the called or the calling party, to determine according to the received first identification information enabling presenting of the multimedia information related to the called or the calling party and a further identification of the called or calling party, and to initiate a sending of a further message comprising the information enabling the presenting of the multimedia information and the further identification of the called or the calling party towards the respective other party's terminal.

A further object of the invention is a network database for providing multimedia information related to a called party to a user of a calling party's terminal or for providing multimedia information related to a calling party to a user of a called party's terminal. The network database comprises a storage for storing information enabling presenting of multimedia information related to a subscriber, wherein the information enabling the presenting of the multimedia information is accessible from the storage via an identification of the subscriber. The network database further comprises an interface for sending, an interface for receiving messages and a processing system for processing said messages. The processing system is adapted to process a received request for the information enabling the presenting of the multimedia information, the request comprising the identification of the subscriber, to retrieve the stored information enabling the presenting of the multimedia information from the storage using the received identification of the subscriber, and to provide the information enabling the presenting of the multimedia information.

DETAILED DESCRIPTION OF EMBODIMENTS

In the following the invention is described in more detail by means of embodiments and figures. Equal reference signs indicate equal elements.

Figure 1:
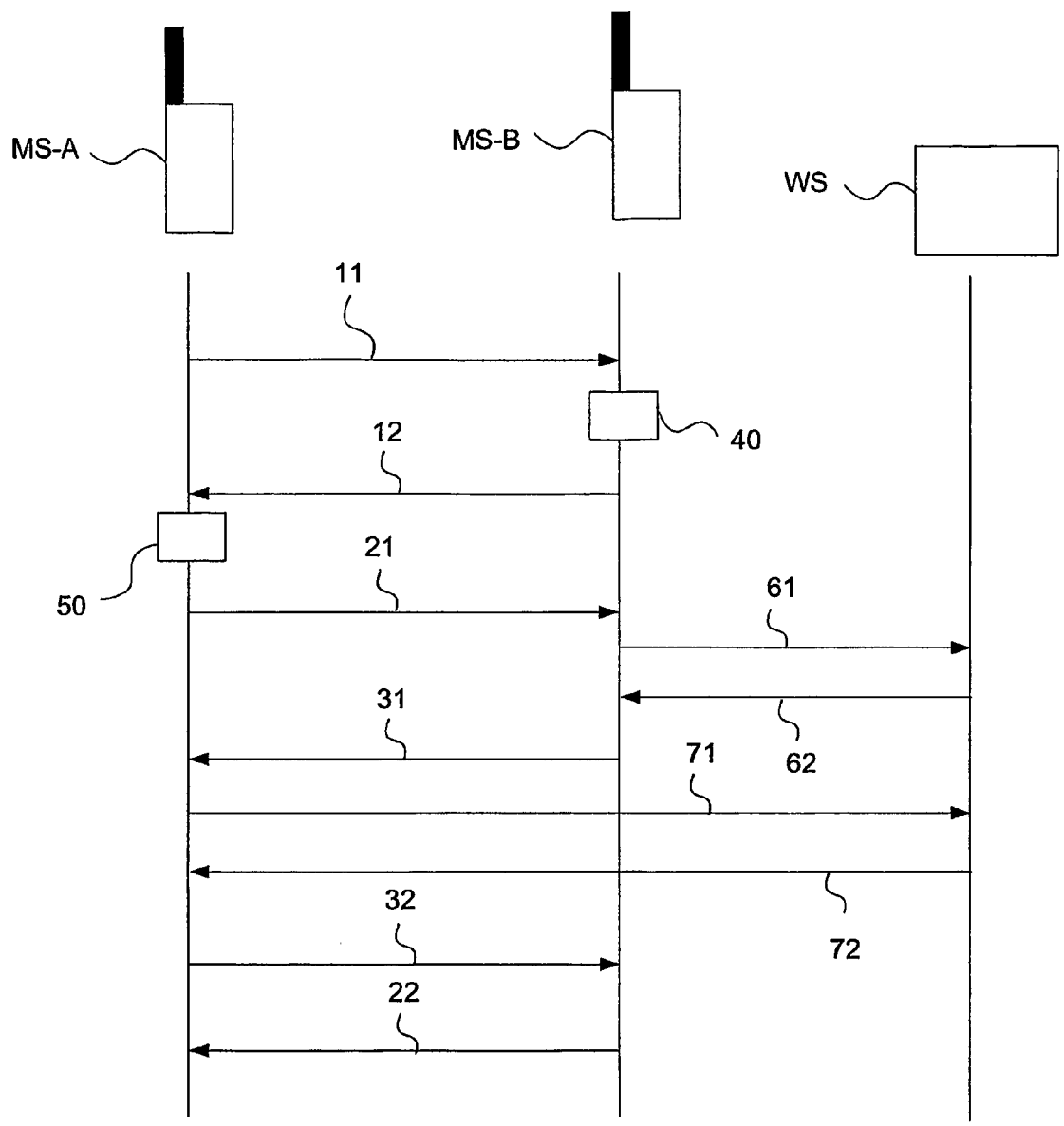
FIG. 1 depicts a message flow between a calling party's terminal, a called party's terminal, and a web server in which multimedia information related to the calling party is provided to the called party and in which multimedia information related to the called party is provided to the calling party.

FIG. 1 depicts a calling party's terminal MS-A, a called party's terminal MS-B, and a web server WS. Furthermore FIG. 1 depicts messages that are exchanged during a call set up that contribute to a providing of multimedia media information related to the called party respectively the calling party. For simplicity reasons steps performed in an access network or a core network performed for call set-up are not described.

A call is set up from a calling party's terminal MS-A to a called party's terminal MS-B. The called party's terminal MS-A and the calling party's terminal MS-B are capable of presenting multimedia information to a user. Multimedia information can be a picture or a video sequence related to a subscriber, a piece of music or a sequence of tones. The calling party's terminal MS-A and the called party's terminal MS-B can be mobile terminals for a GPRS (General Packet Radio System) network or a UMTS (Universal Mobile Telecommunication System) network Optionally the web server WS can store and provide the multimedia information to the calling party's terminal MS-A respectively the called party's terminal MS-B.

The calling party's terminal MS-A sends at call setup a first message 11 to the called party's terminal MS-B. The first message 11 comprises information enabling retrieving of multimedia information related to the calling party and an identification of the multimedia information. The information enabling retrieving multimedia information can be the multimedia information itself or a network address enabling retrieving of the multimedia information. The network address enabling retrieving of multimedia information can be a URL (Uniform Resource Locator). The identification of the multimedia information can be an identification of the calling party's terminal MS-A, an identification of the calling party subscriber or a temporary identification of the multimedia information that is used for the purpose of the call set up only. The identification of the calling party's terminal MS-A can be a calling line identity such as a number compliant with the E.164 specification of the International Telecommunication Union. The first message 11 can comply with the SIP (Session Initiation Protocol).

The calling party's terminal MS-A can be configured such that the first message 11 is sent depending on the calling line identity. Furthermore the calling party's terminal MS-A can be configured such the multimedia information that can be retrieved from the information of the first message 11 can be dependent on the calling line identity. To configure the calling party's terminal MS-A an address book can be used.

The information enabling retrieving of multimedia information is stored related to the identification of the multimedia information in a step 40 by the called party's terminal MS-B.

The called party's terminal MS-B acknowledges the reception of the first message 11 in a first acknowledgement message 12 to the calling party's terminal MS-A.

The calling party's terminal MS-A can store an identification of the called party at call set up in a step 50. Preferably this identification of the called party is a called party number that complies with the E.164 specification of the International Telecommunication Union.

The calling party's terminal MS-A sends a call setup message 21 to the called party's terminal MS-B. The call setup message comprises an identification of the calling party such as a calling line identification complying with the E.164 specification of the International Telecommunication Union. Furthermore the call setup message 21 comprises an identification of the called party such as the called party number complying with the E.164 specification of the International Telecommunication Union. The identification of the calling party can serve as identification of for the multimedia information related to the calling party. Optionally the call setup message 21 can comprise an identification of the multimedia information related to the calling party, that is not an identification of the calling party.

Upon reception of the call setup message 21, the multimedia information related to the calling party is retrieved according to the received identification of the multimedia information. I.e. if the multimedia information related to the calling party itself has been stored in the called party's terminal MS-B in the step 40, the multimedia information is retrieved from the storage in the called party's terminal MS-B. If a network address enabling retrieving of the multimedia information has been stored in the called party's terminal MS-B, the network address is retrieved according to the identification of the multimedia information, and the multimedia information is retrieved using the network address. The multimedia information can be e.g. stored related to a Uniform Resource Locator (URL), the network address in this case, by a web server WS. The multimedia information is then requested in a first request message 61 from the called party's terminal MS-B to the web server WS, and returned to the called party's terminal MS-B in a first response 62 by the web server WS. The multimedia information related to the calling party is presented to the user of the called party's terminal MS-B.

The called party's terminal MS-B sends a further message 31, that comprises information enabling retrieving of multimedia information related to the called party and an identification of the called party to the calling party's terminal MS-A. The identification of the called party can be a called party number complying with the E.164 specification of the International Telecommunication Union. Preferably the called party's terminal MS-B is configurable such that the further message 31 is sent depending on the calling line identification received in the call setup message. Furthermore the called party's terminal MS-B is advantageously configurable such that the multimedia information that can be retrieved using the information of the further message 31 is dependent on the calling line identification. To configure the calling party's terminal MS-B an address book is advantageously used.

The further message 31 can be a SIP (session initiation protocol) message. The information enabling retrieving multimedia information can be the multimedia information itself or a network address enabling retrieving of the multimedia information. The network address enabling retrieving of multimedia information can be a URL (Uniform Resource Locator) or a network address of a node optionally plus an identification of the multimedia information.

The received identification of the called party and the identification of the called party stored at call setup are compared in the calling party's terminal MS-A. If the received identification and the identification stored at call set up are identical, multimedia information related to the called party is retrieved by the calling party's terminal MS-A. Either the multimedia media information is retrieved from the further message 31 or, if a network address enabling retrieving of multimedia information has been comprised in the further message 31, the multimedia information is retrieved using the network address. The multimedia information can be e.g. stored related to a Uniform Resource Locator (URL), the network address in this case, by the web server WS. The multimedia information is then requested in a second request message 71 from the calling party's terminal MS-A to the web server WS, and returned to the calling party's terminal MS-A in a second response message 72 by the web server WS. In the second request message 71 the URL for the multimedia information is included. Afterwards the multimedia information related to the called party is presented to the user of the calling party's terminal MS-A.

The calling party's terminal MS-A acknowledges the reception of the further message 31 in a further acknowledgement 32 to the called party's terminal MS-B.

The called party's terminal MS-B acknowledges the reception of the call setup message 21 in a call setup acknowledgement 22 to the calling party's terminal MS-A.

Figure 2:
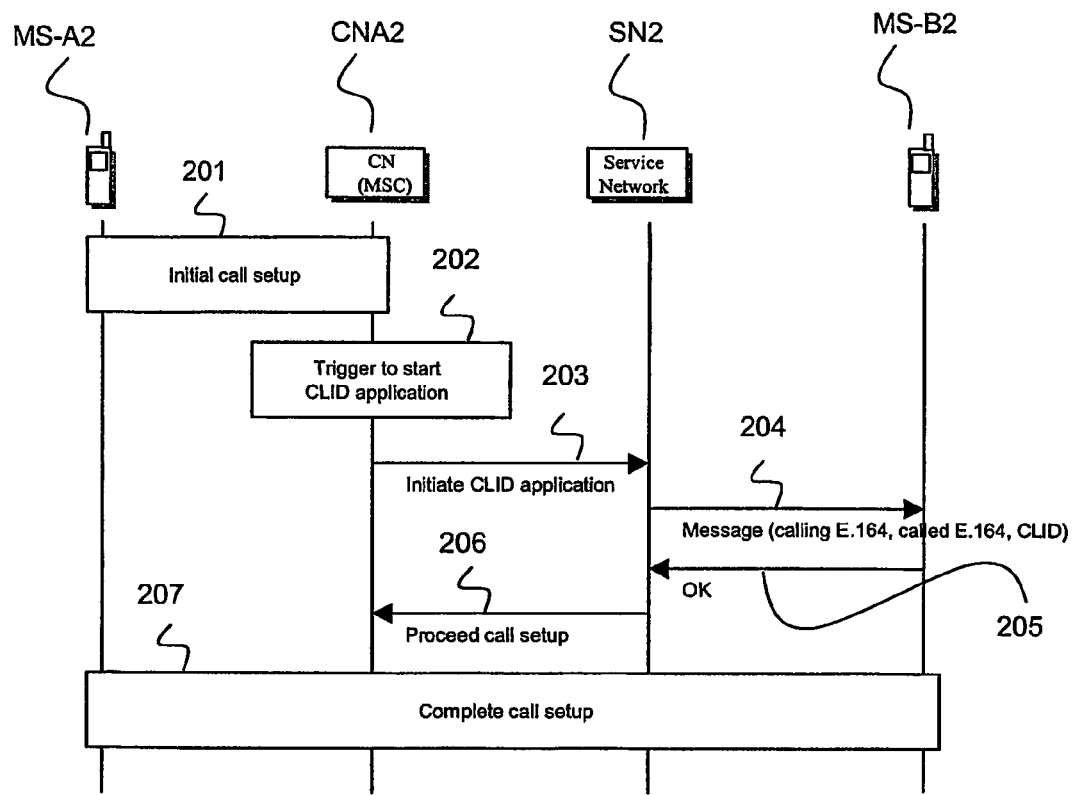
FIG. 2 depicts a message flow between a calling party's terminal and a called party's terminal, in which multimedia information related to the calling party is provided to the called party

FIG. 2 shows a further embodiment of the invention in which multimedia information related to a calling party is presented to the user of a called party's terminal. In the embodiment of FIG. 2 the calling party's terminal can be a terminal that is not able to sent multimedia information itself. In that embodiment a service network SN2 is used to sent the multimedia information respectively to determine the multimedia information to be sent.

FIG. 2 depicts a network comprising a calling party's terminal MS-A2, a called party's terminal MS-B2, a core network node CNA2 administrating the calling party's terminal MS-A2 and a service network SN2 for providing the multimedia information to the calling party's terminal. The service network SN2 comprises a network server and a network database. In a preferred embodiment the core network node CNA2 stores or has access to subscriber data of the calling subscriber, wherein the subscriber data comprises an indication for a demand for providing a service. The network database within the service network SN2 stores information enabling a presenting of the multimedia information related to the calling party, wherein the information enabling the presenting of the multimedia information is accessible via an identification of the calling party. FIG. 2 further depicts a sequence of messages exchanged between the depicted entities of the network and processing steps to be performed by the network entities. In a call set up procedure 201 between the calling party's terminal MS-A2 and the core network node CNA2 a call from the calling party's terminal MS-A2 to the called party's terminal MS-B2 is initiated. The call set up procedure 201 comprises a sending of an identification of the calling party, e.g. a calling party number related to the calling party's terminal MS-A2 and a called party number related to the called party's terminal MS-B2. In the core network node CNA2 a demand for providing a service called party's terminal is recognized in a step 202. This recognizing can be performed in the core network node CNA2 based on a trigger received in the call set up message or this recognizing can be based on the identification of the calling party and on subscriber data stored related the calling party by the core network node CNA2. Said subscriber data can be related to an IN (intelligent network) subscription or a CAMEL (Customized Applications for Mobile network Enhanced Logic) subscription of the calling party. To initiate the providing of the service calling party's terminal the core network node (CNA2) sends a message 203 to the network server in the service network SN2, the message 203 comprising an identification of the calling party's terminal MS-A2 e.g. the calling party number and the called party number. The network server recognizes according to the received message 203, that the service to be provided comprises a presenting of multimedia information that is related to the calling party to the user of the called party's terminal MS-B2. Furthermore the network server determines according to the identification of the calling party information enabling presenting of multimedia information related to the calling party and an identification of the multimedia information. To that end the network server can send a request for the information enabling the presenting of the multimedia information to the network database, wherein the request comprises the identification of the calling party. Upon the reception of the request the network database retrieves the stored information enabling the presenting of the multimedia information using the received identification of the calling party. The network database provides the information enabling the presenting of the multimedia information to the network server.

The information enabling the presenting of the multimedia information can be the multimedia information itself or a network address enabling the presenting of the multimedia information. The network address enabling retrieving of multimedia information can be a URL (Uniform Resource Locator). The identification of the multimedia information can be an identification of the calling party's terminal MS-A2, an identification of the calling party subscriber or an identification of the multimedia information that is used for the purpose of the call set up. The identification of the calling party's terminal MS-A2 can be a calling line identity such as a number compliant with the E.164 specification of the International Telecommunication Union. The network server sends a message 204 comprising the information enabling the presenting of the multimedia information related to the calling party and the identification of the multimedia information towards the called party's terminal MS-B2. The message 204 can comply with the SIP (Session Initiation Protocol). The message 204 further comprises the called party number.

The information enabling the presenting of the multimedia information is stored related to the identification of the multimedia information by the called party's terminal MS-B2.

The called party's terminal MS-B2 can acknowledge the reception of the message 204 in an acknowledgement message 205 to the service network SN2.

Upon reception of the acknowledgement message 205 the service network can trigger the core network node CNA2 to proceed with the call setup in a trigger message 206.

The call set up is completed in a call setup completion procedure 207.

During the call setup completion procedure 207 the calling party's terminal MS-A2 sends a call setup message to the called party's terminal MS-B2. The call setup message comprises an identification of the calling party such as a calling line identification complying with the E.164 specification of the International Telecommunication Union. Furthermore the call setup message comprises an identification of the called party such as the called party number complying with the E.164 specification of the International Telecommunication Union. Optionally the call setup message can comprise the identification of the multimedia information related to the calling party, that is not an identification of the calling party.

Upon reception of the call setup message the multimedia information related to the calling party is retrieved according to the stored identification of the multimedia information. I.e. if the multimedia information related to the calling party itself has been stored in the called party's terminal MS-B2, the multimedia information is retrieved from the storage in the called party's terminal MS-B2. If a network address enabling retrieving of the multimedia information has been stored in the called party's terminal MS-B2, the network address is retrieved according to the identification of the multimedia information, and the multimedia information is retrieved using the network address. The multimedia information can e.g. be stored related to a Uniform Resource Locator (URL), the network address in this case, by a web server. The multimedia information can then be requested by the called party's terminal MS-B2 from the web server using the URL, and returned to the called party's terminal MS-B2 by the web server WS. The multimedia information related to the calling party is presented to the user of the called party's terminal MS-B2.

Figure 3:
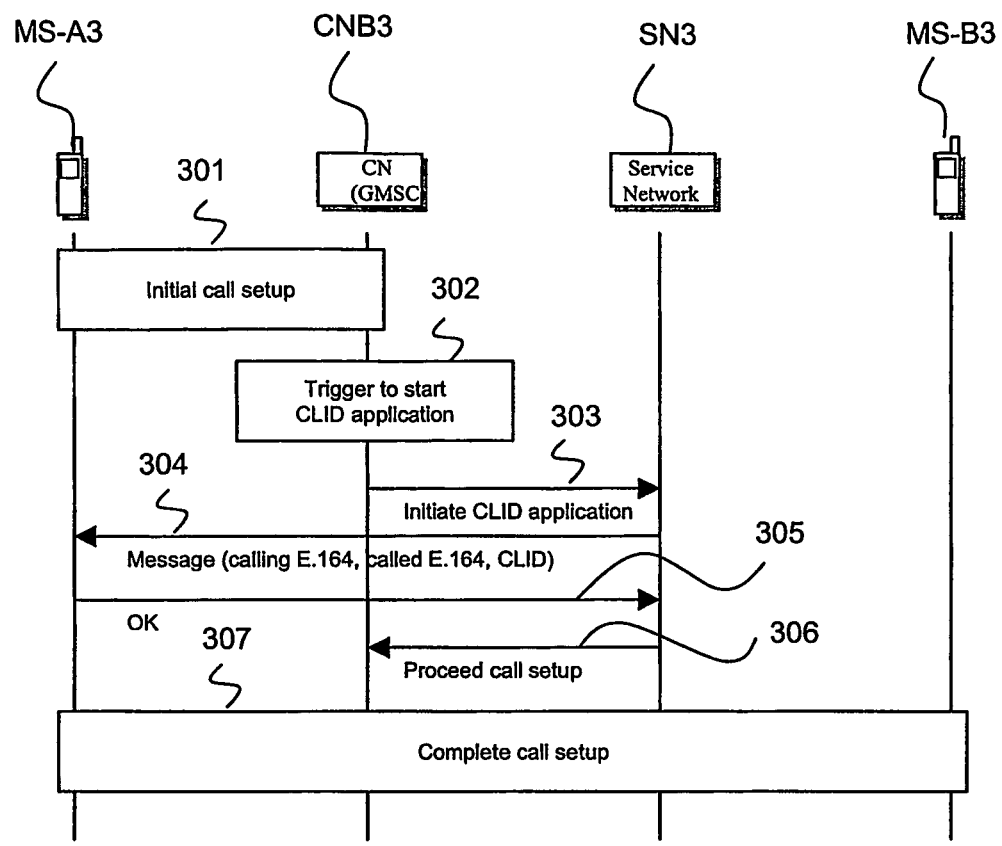
FIG. 3 depicts a message flow between a calling party's terminal and a called party's terminal in which multimedia information related to the called party is provided to the calling party.

FIG. 3 shows a further embodiment of the invention in which multimedia information related to a called party is presented to the user of a calling party's terminal. In the embodiment of FIG. 3 the called party's terminal can be a terminal that is not able to send multimedia information itself. In the embodiment depicted in FIG. 3 a service network SN3 is used to send the multimedia information respectively to determine the multimedia information to be sent.

FIG. 3 depicts a network comprising a calling party's terminal MS-A3, a called party's terminal MS-B3, a core network node CNB3 administrating the called party's terminal MS-B3 and a service network SN3 for providing the multimedia information to the calling party's terminal MS-A3.

The service network comprises a network server and a network database. In a preferred embodiment the core network node CNB3 stores or has access to subscriber data of the called subscriber, wherein the subscriber data comprises an indication for a demand for providing a service. The network database within the service network stores information enabling a presenting of the multimedia information related to the called party, wherein the information enabling the presenting of the multimedia information is accessible via an identification of the called party.

FIG. 3 further depicts a sequence of messages exchanged between the depicted entities of the network and processing steps to be performed by the network entities. In a call set up procedure 301 between the calling party's terminal MS-A3 and the core network node CNB3 a call from the calling party's terminal MS-A3 to the called party's terminal MS-B3 is initiated. In the call set up procedure 301 a called party number related to the called party's terminal MS-B3 and a calling party number related to the calling party's terminal MS-A3 is transmitted to the core network node CNB3.

The calling party's terminal MS-A3 stores an identification of the called party at call set up. Preferably this identification of the called party is a called party number that complies with the E.164 specification of the International Telecommunication Union.

In the core network node CNB3 a demand for providing a service is recognized in a step 302. This recognizing can be performed in the core network node CNB3 based on subscriber data stored related to the user of the called party's terminal MS-B3 by the core network node CNB3. Said subscriber data can be related to an IN (intelligent network) subscription or a CAMEL (Customized Applications for Mobile network Enhanced Logic) subscription of the called party's terminal MS-B3 user. To initiate the providing of the service the core network node sends a message 303 to the network server in the service network SN3, the message 303 comprising a first identification of the called party's terminal MS-B3 e.g. the called party number. Furthermore the message 303 comprise the calling party number.

The network server recognizes according to the received message 203, that the service to be provided comprises a presenting of multimedia information that is related to the called party to the user of the calling party's terminal MS-A3. Furthermore the network server determines according to the identification of the called party's terminal MS-B3 information enabling presenting of multimedia information related to the called party and, optionally a further identification of the called party's terminal MS-B3.

To that end the network server can send a request for the information enabling the presenting of the multimedia information to the network database, wherein the request comprises the identification of the called party. Upon reception of the request the network database retrieves the stored information enabling the presenting of the multimedia information using the received identification of the called party. The network database provides the information enabling the presenting of the multimedia information to the network server.

The information enabling the presenting of the multimedia information can be the multimedia information itself or a network address enabling retrieving of the multimedia information. The network address enabling retrieving of multimedia information can be a URL (Uniform Resource Locator). The identification of the called party's terminal MS-B3 can be a called party number such as a number compliant with the E.164 specification of the International Telecommunication Union.

The network server sends a message 304 comprising the information enabling the presenting of the multimedia information related to the called party and an identification of the called party's terminal MS-B3 to the calling party's terminal MS-A3. In case the further identification of the called party has been determined, the further identification is used as the identification of the called party's terminal MS-B3.

The message 304 can comply with the SIP (Session Initiation Protocol).

The received identification of the called party and the identification of the called party stored at call setup are compared in the calling party's terminal MS-A3. If the received identification and the identification stored at call set up are identical, multimedia information related to the called subscriber is retrieved by the calling party's terminal MS-A3. Either the multimedia media information is retrieved from the message 304 or, if a network address enabling retrieving of multimedia information has been comprised in the message 304, the multimedia information is retrieved using the network address. The multimedia information can be e.g. stored related to a Uniform Resource Locator (URL), the network address in this case, by a web server. The multimedia information can then be requested by the calling party's terminal MS-A3 from the web server and returned to the calling party's terminal MS-A3 in a response by the web server. In the request to the web server the URL for the multimedia information can be used. The multimedia information related to the called party is presented to the user of the calling party's terminal MS-A3.

The calling party's terminal MS-A3 can acknowledge the reception of the message 304 in an acknowledgement message 305 to the service network SN3.

Upon reception of the acknowledgement message 305 the service network can trigger the core network node CNB3 to proceed with the call setup in a trigger message 306.

The call set up is completed in a call setup completion procedure 307.

Figure 4:
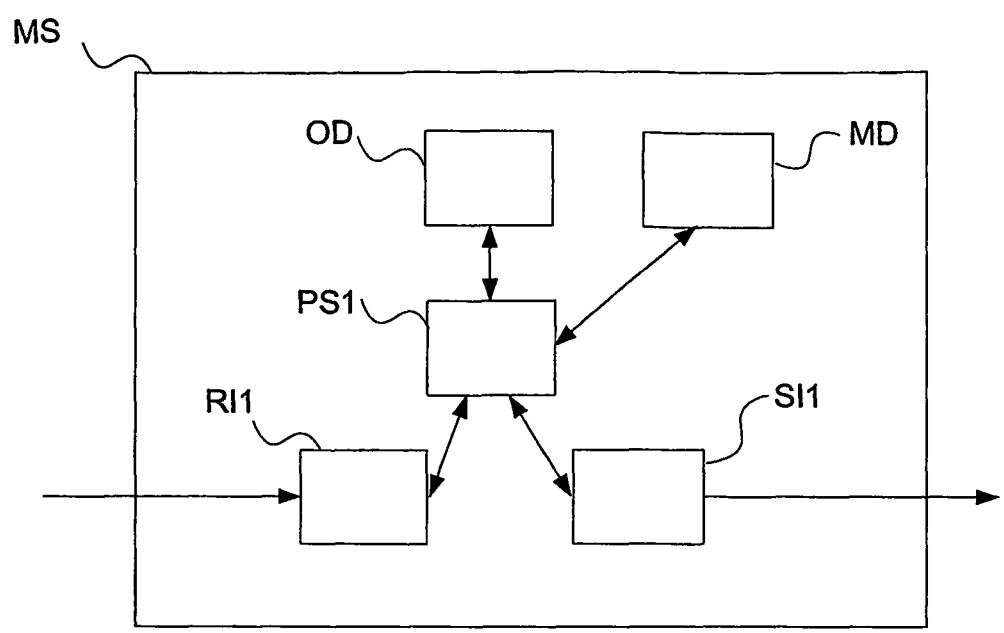
FIG. 4 depicts a mobile station according to the invention.

FIG. 4 depicts a mobile station MS for providing multimedia information related to a calling party as well as multimedia information related to a called party during a call setup. The mobile station MS is provided with a first interface RI1 for receiving messages, a second interface SI1 for sending messages, a processing system PS1 for processing messages, a memory device MD, and an output device OD for presenting the multimedia information to a user of the mobile station. The processing system PS1 is connected to the first interface RI1, to the second interface SI1, the memory device MD and to the output device OD for message exchange. The processing system PS1 is adapted to process a first message received at a call set up, wherein the first message comprises information enabling presenting of the multimedia information related to the calling party and an identification of the multimedia information. The memory device MD is adapted to store the information enabling the presenting the multimedia information related to the identification of the multimedia information. The processing system PS is adapted to process a received call setup message comprising the identification of the multimedia information, to retrieve the multimedia information according to the identification of the multimedia information from the memory device MD, and to initiate presenting the multimedia information to the user of the mobile station via the output device OD.

Furthermore the processing system PS is adapted to store at call set up a first identification of the called party, and to process a further message comprising information enabling presenting of the multimedia information related to the called party and a further identification of the called party, wherein the further message is received via the first interface RI1. The processing system is further adapted to compare the first and the further identification of the called party and, according to the result of the comparison, to initiate presenting the multimedia information to the user of the mobile station MS via the output device OD.

Figure 5:
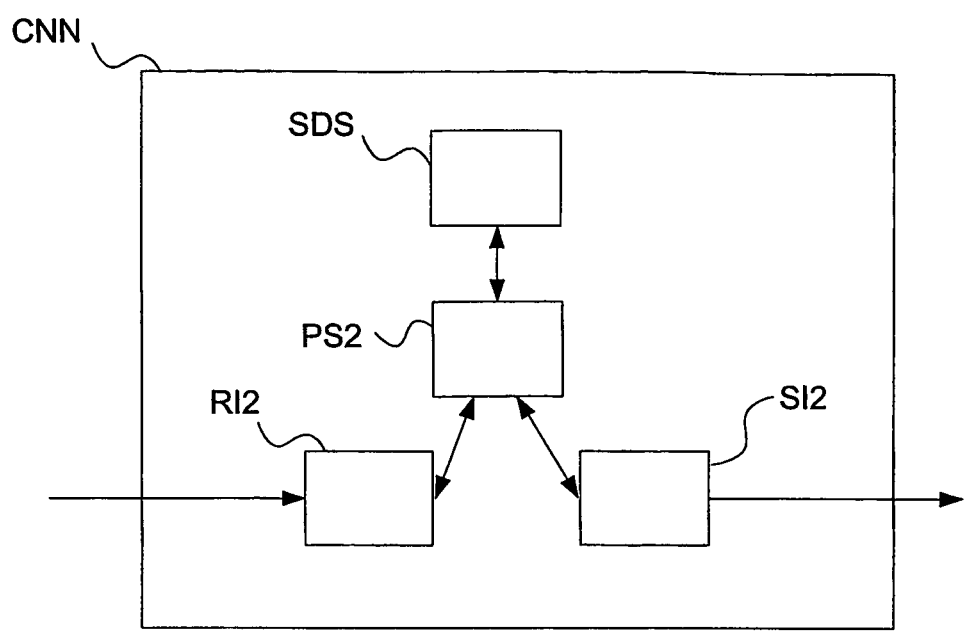
FIG. 5 depicts a core network node according to the invention.

FIG. 5 depicts a core network CNN node for providing of multimedia information related to a called party to a user of calling party's terminal or for providing of multimedia information related to a calling party to a user of a called party's terminal. The core network node CNN comprises a subscriber data storage SDS storing subscriber data of the called or the calling party subscriber, the subscriber data comprising an indication for a demand for presenting the multimedia information. Furthermore the core network node CNN comprises a first interface RI2 for receiving messages, a second interface SI2 for sending messages, and a processing system PS2 for processing messages. The processing system PS2 is connected to the first interface RI2, to the second interface SI2, and the subscriber data storage SDS for message exchange. The processing system PS2 is adapted to process a call set up message received via the first interface RI2, wherein the call set up message comprises an identification of the called or the calling party subscriber. The processing system PS is further adapted access the subscriber data storage SDS to recognize according to received identification of the called or the calling party subscriber the demand for the providing of the multimedia information. According to this recognizing of the demand for the providing of the multimedia information, the processing system PS2 is adapted to initiate the providing of the multimedia information.

Figure 6:
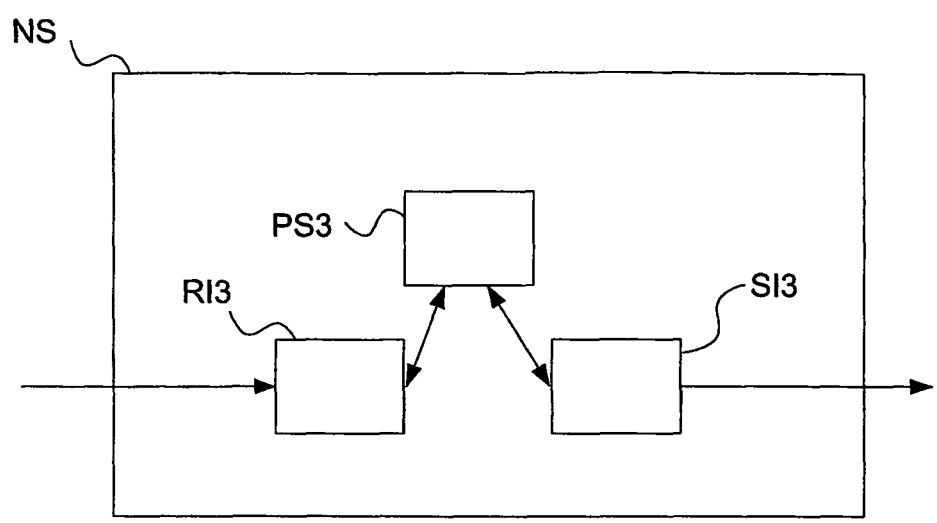
FIG. 6 depicts a network server according to the invention.

FIG. 6 depicts a network server NS for providing multimedia information related to a called party to a user of calling party's terminal or for providing multimedia information related to a calling party to a user of a called party's terminal. The network server NS comprises a first interface RI3 for receiving messages, a second interface SI3 for sending messages, and a processing system PS3 for processing messages. The processing system PS3 is connected to the first interface RI3 and to the second interface SI3 for message exchange. The processing system PS3 is adapted to process a first message received via the first interface RI3 during a call setup and comprising a first identification of the called or the calling party. The processing system PS is further adapted to determine according to the received first identification information enabling presenting of the multimedia information related to the called or the calling party and a further identification of the called or calling party. The processing system PS3 is adapted to initiate a sending of a further message via the second interface SI3 towards the respective other party's terminal. The further message comprises the information enabling the presenting retrieving of the multimedia information and the further identification of the called or the calling party.

Figure 7:
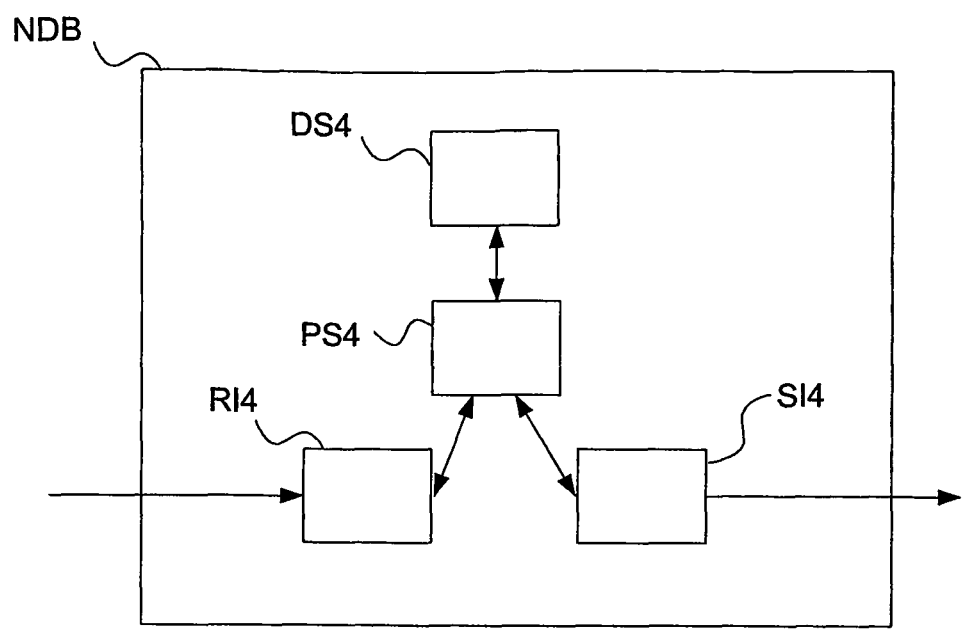
FIG. 7 depicts a network database according to the invention.

FIG. 7 depicts a network database NDB for providing multimedia information related to a called party to a user of calling party's terminal or for providing multimedia information related to a calling party to a user of a called party's terminal. The network database NDB comprises a storage unit DS4 for storing information enabling presenting of multimedia information related to a subscriber, the information enabling the presenting retrieving of the multimedia information being accessible from the storage via an identification of the subscriber. The network database NDB further comprises a first interface RI4 for receiving messages, a second interface SI4 for sending messages and a processing system PS4 for processing messages. The processing system PS4 is connected to the first interface RI4, to the second interface SI4 and to the storage unit DS4 for message exchange. The processing system is adapted to process a request for the information enabling the presenting of the multimedia information wherein the request is received via the first interface RI4 and the request comprises the identification of the subscriber. The processing system PS4 is further adapted to retrieve the stored information enabling the presenting retrieving of the multimedia information from the storage unit DS4 using the received identification of the subscriber, and to provide the information enabling the presenting of the multimedia information.

The invention claimed is:

1. A method, in a telecommunications network, of providing multimedia information associated with a called party terminal to a calling party terminal, the method comprising the steps of:

retrieving subscriber data of the called party terminal at the core network node, wherein the subscriber data comprises a demand for providing the multimedia information;

receiving, in the core network node from the calling party terminal, a call set up message comprising an identification of the called party terminal;

storing, at the calling party terminal, the identification of the called party terminal;

recognizing, at the core network node, the demand for providing the multimedia information, according to the subscriber data and the received identification of the called party terminal;

sending a message from the core network node to a network server to initiate provision of the multimedia information to the calling party terminal;

receiving, at the calling party terminal from the network server, the identification of the called party together with information enabling presentation of the multimedia information, the information enabling presentation of the multimedia information comprising a network address or Universal Resource Locator (URL);

comparing, at the calling party terminal, the called party terminal identification received from the network server with the previously stored called party terminal identification; and if the called party terminal identification received from the network server matches the previously stored called party terminal identification, using the information enabling presentation of the multimedia information to retrieve and present the multimedia information at the calling party terminal.

2. The method according to claim 1 for providing multimedia information associated with a called party to a calling party's terminal wherein the subscriber data is related to an IN subscription or a CAMEL subscription of the called party.

3. The method according to claim 1, for providing multimedia information wherein the call set up message is appropriate for setting up a circuit switched call and the multimedia information is provided using a packet switched connection.

4. A first user terminal for use in a telecommunications network for providing communication with a second user terminal in the telecommunications network, the user terminal comprising:

at least one processor; and at least one memory containing instructions that, when executed by the at least one processor, cause the at least one processor to:

send a call set up message to a core network node in the telecommunications network to initiate a call to the second user terminal, the call set up message comprising an identification of the second user terminal;

store the identification of the second user terminal;

receive, from a network server in communication with the core network node, the identification of the second user terminal together with information enabling presentation of multimedia information associated with the second user terminal, the information enabling presentation of the multimedia information comprising a network address or Universal Resource Locator (URL);

compare, at the first user terminal, the second user terminal identification received from the network server with the previously stored second user terminal identification; and if the second user terminal identification received from the network server matches the previously stored second user terminal identification, use the information enabling presentation of the multimedia information to retrieve and present the multimedia information at the first user terminal.

5. The first user terminal according to claim 4, wherein the information enabling presentation of multimedia information associated with the second user terminal is received if subscriber data of the second user terminal retrieved by the core network node comprises a demand for providing the multimedia information.

6. The first user terminal according to claim 5, wherein the subscriber data is related to an IN subscription or a CAMEL subscription of the second user terminal.

7. The first user terminal according to claim 4, wherein the call set up message is appropriate for setting up a circuit switched call and the multimedia information is retrieved by the first user terminal using a packet switched connection.

* * * * *